(12) United States Patent
Hefftler et al.

(10) Patent No.: US 7,478,593 B2
(45) Date of Patent: Jan. 20, 2009

(54) METHOD FOR MAKING COMPENSATIONS FOR REGISTER DEVIATIONS

(75) Inventors: Victor Hefftler, Coswig (DE); Martin Riese, Radebeul (DE)

(73) Assignee: Koenig & Bauer AG, Radebeul (DE)

( * ) Notice: Subject to any disclaimer, the term of this patent is extended or adjusted under 35 U.S.C. 154(b) by 397 days.

(21) Appl. No.: 11/295,069

(22) Filed: Dec. 6, 2005

(65) Prior Publication Data

US 2007/0034101 A1 Feb. 15, 2007

(30) Foreign Application Priority Data

Dec. 23, 2004 (DE) .................. 10 2004 062 110
Dec. 23, 2004 (DE) .................. 10 2004 062 112

(51) Int. Cl.
*B41F 13/24* (2006.01)
(52) U.S. Cl. ........................ 101/484; 101/483
(58) Field of Classification Search .................. 101/484
See application file for complete search history.

(56) References Cited

U.S. PATENT DOCUMENTS 5,596,931 A 1/1997 Rossler et al.

FOREIGN PATENT DOCUMENTS

| DE | 38 28 638 C1 | 7/1989 |
|---|---|---|
| DE | 42 34 331 A1 | 4/1994 |
| DE | 44 12 945 A1 | 10/1995 |
| DE | 44 34 843 A1 | 4/1996 |
| DE | 198 24 834 A1 | 12/1999 |
| DE | 199 14 627 A1 | 10/2000 |
| DE | 19961880 A1 * | 3/2001 |
| DE | 101 49 525 A1 | 5/2002 |
| DE | 102 59 494 A1 | 7/2003 |
| DE | 10 2004 048 151 A1 | 4/2006 |
| EP | 0 592 850 B1 | 4/1994 |
| EP | 05 92 850 B1 | 4/1994 |
| EP | 1 454 757 A2 | 9/2004 |
| JP | 60 067948 A | 4/1985 |

OTHER PUBLICATIONS

A search report provided by the German Patent and Trademark Office.
A search report provided by the European Patent Office.
Roland Dreyer, Druckmaschinen dürgen nicht In Schwingung geraten, Deutscher Drucker, Deutscher Drucker Verlagsgesellschaft, Ostfildern, DE, Bd. 37, Nr. 42, Nov. 15, 2001.

* cited by examiner

*Primary Examiner*—Daniel J Colilla
*Assistant Examiner*—Jung H Nam
(74) *Attorney, Agent, or Firm*—Goodwin Procter LLP (57) ABSTRACT

The invention relates to a method of compensating for register deviations, which enables printing quality-reducing register deviations to be avoided at all printing or coating units of a rotary printing press. The method includes: a one-time determination of rotational vibrations in the driving gear train and of thereby caused register deviations between the printing or coating units only in the resonance regions of rotational speed under printing conditions within a rotary printing speed range; ascertaining counter-directed harmonic compensation moments from discrete harmonic portions of the rotational vibrations in the resonance range of rotational speeds; storing the parameters of the harmonic compensation moments and assigning them to the resonance ranges of rotational speed in the driving control system; and superimposing the stored compensation moments as a function of the rotational speed on the driving moment of the main drive motor in printing operation.

15 Claims, 4 Drawing Sheets

METHOD FOR MAKING COMPENSATIONS FOR REGISTER DEVIATIONS

The invention relates to a method of compensating for register deviations, caused by rotational vibrations, in a sheet-fed rotary printing press with a driving gear train (ARZ), connecting a sheet-feeding apparatus (AN) and printing units and/or coating units (DW), and a main drive motor (M), acting on the driving gear train, to which a drive control system (A) is assigned.

Register deviations are understood to be relative positional deviations when partial printed images (color separations) or lacquer layers are printed on top of one another consecutively in the individual printing and coating units. Systematic register deviations between partial printed images may arise due to inaccuracies in producing the printing forme, faulty positions of the printing forme, handling differences during the transfer of the printed image onto the material to be printed or positional errors of the printed material. These defects can be managed well with known correcting agents at the printing and coating units.

The elimination of register deviations, which result from rotational vibrations of the rotating devices carrying the material to be printed, has been the subject matter of numerous endeavors. In the case of sheet-fed rotary printing presses, it is standard procedure to couple together mechanically with a gear train at least the printing cylinders of the individual printing units as well as the transporting and transferring cylinders, disposed between the printing units and to drive this driving gear train by means of a main driving mechanism. The driving gear train of a printing press with the rotating devices coupled thereto forms a vibrational system, the dynamics of which are determined by load moments, spring constants, moments of inertia, etc. The uniform rotation of the elements of this drive train can be disturbed by angle-dependant rotational vibrations, which recur periodically with each revolution (synchronous) and by rotational vibrations, which do not recur periodically (asynchronous). The tendency to vibrate increases as the number of printing units of a sheet-fed rotary printing press increases.

Periodic rotational vibrations in sheet-fed rotary printing presses arise due to torque fluctuations in the driving gear train due to cycle-related or rotational angle-related working movements of cam mechanisms (feed transmissions, oscillating movements in the inking units), centering errors of gear wheels and, above all, unsteadiness in the unwinding contact of cylinders, especially due to cylinder channels, as well as opening and closing movements of the gripper system.

As a result of the elasticity of the driving gear wheels, torque fluctuations lead to individually different deviations from the nominal angle position or to deviations in the synchronicity of the rotational movements up to changes in the teeth flanks at the mutually engaging driving gear wheels.

At certain frequencies (inherent frequencies), the rotational vibrations show time-constant, characteristic local amplitude distributions (inherent vibration forms) over the length of the printing press, which reach local extremes at least at the ends of the driving gear train, that is, generally the first and last printing or coating unit. The inherent frequencies and inherent forms are properties of a printing press, which are independent of the vibration stimulation and depend on the number of printing units and the construction of the press, vibrations in the first inherent form with the lowest inherent frequency dominating, that is, having the largest vibrational amplitudes and therefore finding special consideration in the analysis of the vibrations of a printing press.

In the event that vibrations are stimulated in the driving gear train by interfering rotational vibrations with a frequency in the vicinity of an inherent frequency of the printing press, there is resonance, that is, vibrational reinforcement which expresses itself in rotational speed-dependent, impermissibly high transfer register deviations between the partial printed images or coating layers applied in the individual printing or coating units. Furthermore, these resonances lead to high stresses on the driving elements and promote wear.

Sheet positioning systems (front gauges and pull-type lays) and sheet-accelerating systems (swinging feeder, stop drum) of sheet-feeding equipment, which cause fluctuations in the driving moment of the sheet-feeding apparatus as a result of their discontinuous movement, are significant sources of vibrations. Since the sheet-feeding apparatus is also driven by the driving gear train, the vibrations, caused by the sheet-feeding equipment, are transferred to the driving gear train and spread out over the whole of the printing press. The torque fluctuations at the sheet-feeding apparatus increase as the rotational speed increases and lead to quality-endangering vibrational amplitudes in the whole of the driving gear train, which result in impermissibly high transfer register deviations between the partial printed images or coating layers applied in the individual printing or coating units. Furthermore, the rotational vibrations in the driving mechanism, caused by changes in the load, lead to high stresses in the driving elements and promote wear.

Rotational vibrations can be reduced by additional passive and active systems. Previously known devices for this purpose are directed to nonspecific compensation of all periodic and non-periodic rotational vibrations occurring, expensive vibration pick ups and control circuits being required for this purpose.

The DE 44 12 945 A1 discloses a device and a method for reducing rotational vibrations of printing presses with the help of actuating elements, which may also be driving motors, data for triggering the actuation elements being determined either by measurement with vibration pick ups, by calculation or by a sample run of the printing press. The formation of the control signals for the actuating elements is not described in greater detail.

The DE 199 14 627 A1 relates to a method and a device for compensating for rotational vibrations in a printing press, which is equipped in such a manner, that at least an inherent form of the printing press is determined and that for at least one place, at which this inherent form does not have the amplitude of 0, a respective counter moment for the compensation of the moment, which stimulates the vibrations in the inherent form, is applied by a cam mechanism or by an additional motor. Counter moments may be determined for an average rotational speed or also for different rotational speeds and machine parameters. Here also, it remains an open question as to how the counter moments are formed. The expense of additional vibration compensators is a disadvantage.

The DE 101 49 525 A1 describes a method and a device for compensating for a mechanical rotational vibration by superimposing on at least one discrete frequency portion of the rotational vibration, a harmonic moment of the same frequency, which is applied by an actuator, the frequency being determined online as a function of the inherent frequency and of the machine speed. The device comprises a cost-intensive, adaptive control circuit with a vibration sensor and an actuator, which may be a driving motor, applying the harmonic compensation moment of the same frequency directly or indirectly on the machine shaft. It is a disadvantage that the method is directed to the maximum compensation of vibrations at only one machine shaft.

The EP 0 592 850 B1 discloses a device and a method, which provides active actuating elements, such as motors, at the individual cylinders, in order to control the motors over control circuits in such a manner, that regulating forces, which cancel the vibrations, result. This method is therefore not a selective counter-strategy from the very start against vibrations in the machine-typical inherent forms. Instead, the asynchronous, that is, only non-periodic vibrations, which occur with the rotations of the rotating parts, are measured and then counteracted at the site of measurement. However, the compensation is not optimized temporally in this way and requires a great expense for control, the danger existing that the control has an excessive time delay or itself causes vibrations.

It is, furthermore, a common disadvantage of the known vibration compensating methods that they are not oriented towards a minimum printing quality, which is to be attained.

Starting out from the disadvantages of the state of the art, it is therefore an object of the invention to configure a method for reducing register deviations caused by rotational vibrations, the method enabling quality-reducing register deviations to be avoided at all printing or coating units of a rotary printing press with existing means.

Pursuant to the invention, the objective is accomplished by a method with the distinguishing features of the first claim. Advantageous developments of the method are the object of the dependent claims.

The basic concept of the invention consists therein that, in contrast to the known objective of the maximum reduction in the rotational vibrations in all operating situations, which necessarily leads to expensive solutions, the vibration-reducing measures, on the one hand, are restricted only to the resonance regions of the rotational speed, in which superelevated vibrations, which affect printing quality and promote wear, occur, and, on the other, to ensure the adherence to a specified printing quality (maximum permissible register tolerances) at all printing and/or coating units of the printing press (for example, at the sheet-transfer sites between the printing or coating units of a sheet-fed printing press) with existing means.

Pursuant to the invention, this is achieved by superimposing rotational speed-dependent counter moments, which counteract the resonance vibrations and are stored within the driving mechanism control system, on the driving moment of the main drive motor. At different rotational speeds, different harmonic compensation moments with rotational speed-dependent amplitudes are used to dampen the vibrations.

The rotational vibrations, stimulated locally by the vibrations source in the driving gear train, are propagated over mutually meshing gear wheels of the driving gear train over the whole of the printing press. They become noticeable as constantly changing fluctuations of the difference in the angle of rotation between adjacent rotating bodies and, with that, as transfer register defects/doubling defects, which have a critical effect on the quality.

The basic concept of the method, described in claim 11, consists therein that periodic torque fluctuations in the driving mechanism of a sheet-feeding apparatus, which are readily accessible by calculation or measurement, are compensated for by counter-moments of a main drive motor, which is disposed in the immediate vicinity of a sheet-feeding apparatus at the first printing or coating unit, so that the resulting driving moment to the second printing or coating unit is free of the rotational vibrations of the sheet-feeding apparatus. The rotational speed-dependent compensation torques are stored within the drive control system of the main drive motor as a Table of values (angle of the rotation, normalized compensation torque) or as compensating moments with their Fourier coefficients.

The compensating moments are determined once in test runs under printing conditions encountered in practice or from design data and, in later printing operations, rotational speed-dependent portions, as permanently acting algorithms of the driving motor current, are superimposed on these compensating moments. In so doing, the surprising fact is utilized that the interfering asynchronous vibrations are also damped when the synchronous (periodic) vibrations are compensated for by harmonic counter-moments.

The inventive method has the economic advantages that it can be realized with the existing main drive motor and does not require any additional vibration compensators. Instead of expensive control circuits, only a programmable control module for the main drive motor is required. Moreover, the proposed method guarantees the reliability of the printing quality at all printing or coating units with a minimum of compensating means.

The inventive method is to be explained in greater detail by an example of a sheet-fed rotary printing press. In the associated drawings.

Figure 1:
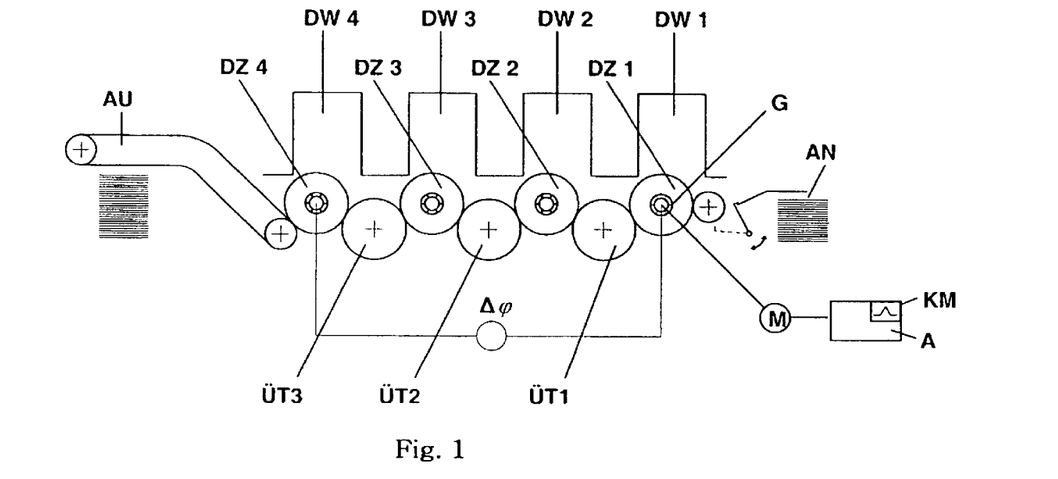
FIG. 1 shows a diagrammatic representation of a sheet-fed rotary printing press with rotational vibration-measuring devices and vibration compensation.

In FIG. 1, a sheet-fed rotary printing press of series construction is shown diagrammatically with a sheet-feeding apparatus AN, printing units DW 1 . . . 4 and sheet-delivery equipment AU. Of the printing units, only the vibration-relevant, sheet-guiding printing cylinders DZ 1 . . . 4 and the transfer drums ÜT 1 . . . 3 are shown. At least the rotational movement of these rotating objects is synchronized over a continuous driving gear train ARZ. The driving moment $M_A$ of a main drive motor M for the printing press is supplied over the printing cylinder DZ1 of the first printing unit DW1 to the driving gear train ARZ. The rotational speed and torque of the main drive motor M is controlled by a driving control system A.

A plurality of working movements, which are connected with changes in the load, takes place in a sheet-fed rotary printing press. Periodic (synchronous) and asynchronous rotational vibrations S in the uniform rotational movement of the rotating bodies DZ, ÜT, connected over the driving gear train ARZ are brought about in the printing or coating units. If the load change amplitudes exceed a certain measure, there will be excessive increases in vibration $S_R > S_{zul}$ in the resonance regions of the rotational speed $n_R$ in certain sections of the driving gear train ARZ, in which the inherent-vibrations of the printing press are particularly pronounced, and, with that, there will be impermissible fluctuations in the angle of rotation positions during the transfer of sheets from one gripper system to the following gripper system (transfer register) and, as a result, there will be impairment in printing accuracy, which can no longer be tolerated. These resonance vibrations $S_R > S_{zul}$, which are relevant for the printing quality, are determined by measurement and subjected to a Fourier analysis.

According to this, the vibrations S can be described as the sum of i discrete, harmonic vibrations with different proportions of $a_i$, frequencies and phase positions $b_i$, the frequencies f being whole number multiples (orders) i of the rotational speed n:

f=in $$S = a_0 + a_1 \sin(t(1n) + b_1) + a_2 \sin(t(2n) + b_2) \ldots a_i \sin(t(in) + b_i) \quad (1)$$

with
$a_1$=the amplitude of the ith harmonic vibration
$b_1$=the phase shift of the ith harmonic vibration
t=time
n=rotational speed
I=the whole number ratio between the frequency f of the disorder and the rotational speed of the printing press.

In the range of rotational printing speeds between a lower printing speed $n_u$ and an upper printing speed $n_o$, each printing press has at least one relevant inherent frequency $f_{eig.i}$, the value of which depends essentially on the configuration of the press. When the frequency f of an excitation vibration or a harmonic portion of a vibration i corresponds approximately to one of the I inherent frequencies $f_{eig.i}$ (resonance rotational speed $$i(n_{R,I,i}) = f_{eig.i} \quad (2)$$

there is resonance excitation due to the $i^{th}$ harmonic excitation vibration. This leads to particularly high vibration excitations and, accordingly, to an excessive rise in the vibrations (the resonance vibrations $S_{R,I,i}$) in the driving gear train and in the cylinders and drums connected thereby, the highest rotational vibration amplitudes $S_{eig.1}$ occurring at the resonance with the lowest inherent frequency $f_{eig.1}$. The amplitudes $a_i$ of the harmonic portions of the resonance vibrations $S_R$ generally decrease with increasing order i. At the same time, the damping increases due to movements that are affected by friction, so that the resonances of higher orders i have resonance vibrations of smaller amplitude.

If the inherent frequencies $f_{eig.i}$ of a printing press are known, all resonance frequencies $n_{R,I,i}$ can be determined from (2). A resonance diagram (FIG. 3a) shows the relationship between the inherent frequency $f_{eig.i}$ and the resonance rotational speeds $n_R$.

Figure 3A:
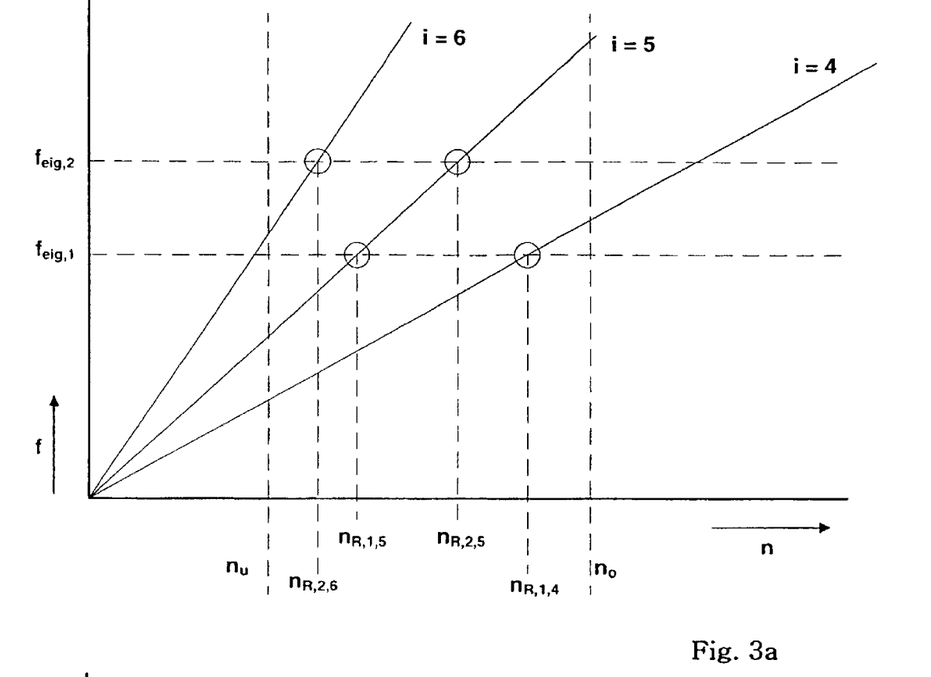
FIG. 3a shows an example of a resonance diagram for a vibration system with two inherent frequencies.

The excitation frequencies f depend on the rotational speed n. They can be described by the straight-line equation f=in and form straight lines, which intersect at the coordinate origin and have a positive slope in a frequency/rotational speed diagram. On the other hand, the inherent frequencies of $f_{eig.I}$ extend parallel to the abscissa. They are constants, which depend on the concrete printing press configuration and not on the rotational speed n. The intersections of horizontal with diagonal lines are the resonance rotational speeds $n_{R,I,i}$.

For example, if the first inherent frequency $f_{eig.1}$=6.5 Hz, the resonance rotational speed of the fourth harmonic vibration $n_{R,1,4}$ is $(6.5/4)s^{-1}$=5850 min.$^{-1}$. In that case, the resonance rotational speed of the second harmonic vibration $n_{R,1,2}$ is 11700 min$^{-1}$, etc.

At the resonance rotational speeds $n_{R,I,i}$, including a certain tolerance range of 10% to 20%, it is to be expected that excessive increases in resonance vibrations $S_{R,I,i}$ occur when the printing press is operated in one of these ranges, which mean an increased stress and increased wear for the printing press and lead to transfer register errors, which can no longer be tolerated. To ensure a constantly high printing quality, it is therefore essential to prevent the formation of resonance vibrations $S_R$ when passing through the critical resonance ranges of the rotational speed. This is accomplished by a selective compensation of the largest harmonic portions of the resonance vibrations $S_{R,I,i}$ in the individual resonance ranges of rotational speed $n_{R,I,i}$ by oppositely directed harmonic compensation moments $M_{K,I,i}$.

The proposed method starts out from the assumption that the inherent frequencies $f_{eig.I}$ and excitation frequencies f in a printing press will not change significantly when their mode of operation is adapted to different printing orders, because the parameters of relevance for vibration, such as the elasticity of the driving gear train ARZ, the inertia of the rotating cylinders DZ and drums ÜT or active peripheral units are not subjected to vibration-relevant changes from printing order to printing order. For this reason, it is sufficient if the resonance ranges of rotational speed $n_R$ and the associated compensation moments $M_K$ are determined once under real printing conditions for the configuration and mode of operation, which are characteristic for the later use of the printing press. In all later operations of the printing press, which are varied in accordance with the orders, the compensation moments $M_K$, superimposed on the driving moment $M_A$, lead to an effective reduction in vibrations.

Advantageously, due to the friction in the printing units and damping systems, the vibrational system in a printing press is highly dampened. The damping increases as the rotational speed n increases, so that, as a rule, only the first inherent frequency $f_{eig.1}$ leads to critical resonance vibrations $S_R$. At the same time, there are only a few relevant harmonic portions of the resonance vibrations $S_R$ with high vibrational amplitudes $a_i$. As a result, there are only a few resonance ranges of rotational speeds $n_R$, which must be taken into consideration in the range of printing rotational speeds $n_U \ldots n_O$, so that the expense of determining the resonance vibrations $S_R$ in the driving gear train ARZ and the oppositely directed torques $M_R$, compensating for these vibrations, is relatively small and the determination must also only be carried out once in a test run, which must be conducted anyhow.

To begin with, the rotational vibrations S that occur on passing through the range $n_u \ldots n_o$ of rotational speeds of the printing are determined in obligatory test runs of the sheet-fed rotary printing presses under operating conditions, which usually are conducted at the place of the manufacture of the printing press, are determined at measurement sites, which are of decisive importance for a register-maintaining printing process. In a case of sheet-fed rotary printing presses, these sites are the printing cylinders DZ, since a rotational angle deviation of a printing cylinder DZ at the sheet transfer leads to a circumferential displacement of the sheet position (transfer register) or a twisting of the printing cylinder DZ with respect to the printing forme and the rubber blanket cylinder transferring the partial printed image to the sheets and to circumferential register deviations of the printed image on the sheet.

For this purpose, the printing press is equipped for the test runs with a transmitter G, which measures the angle of rotation, at each printing cylinder DZ1 . . . (FIG. 1). Transmitters G, which measure the angle of rotation but are not required for controlling the printing press, are dismantled once again at the end of the test runs and are used again for further measurements at other machines, so that the cost of the measurements remains small.

Figure 2:
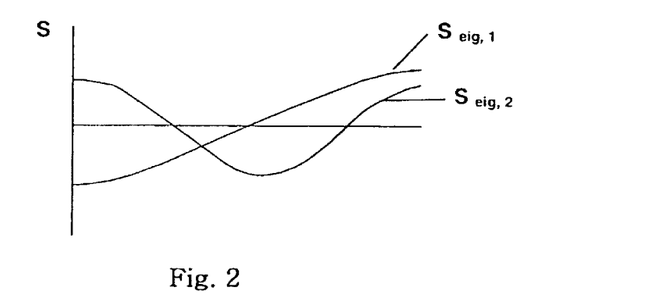
FIG. 2 shows the inherent forms of the resonance vibrations.
Figure 3B:
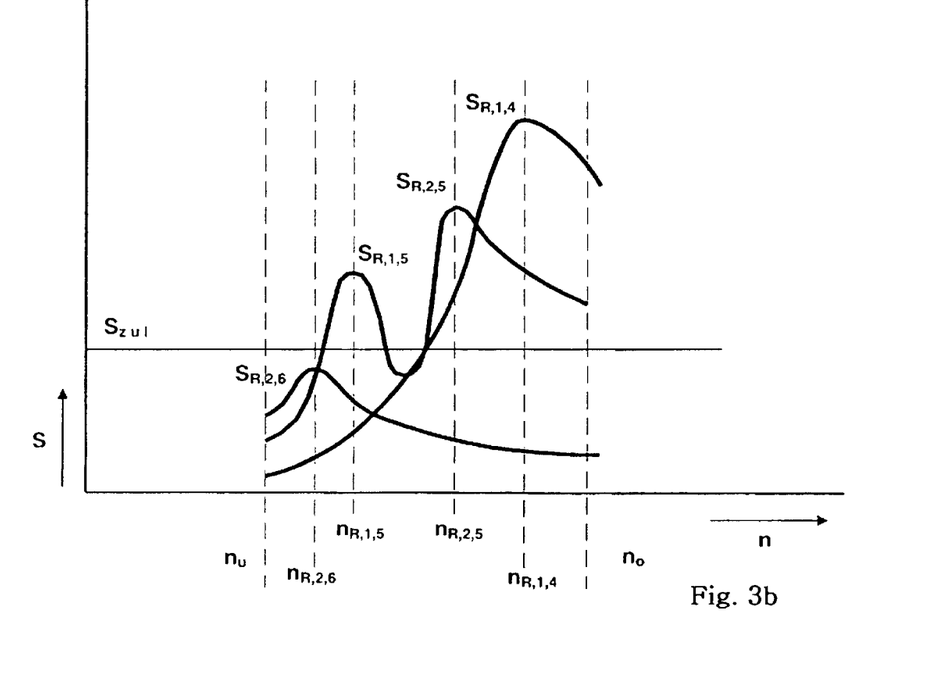
FIG. 3b shows the rotational vibrations as a function of the rotational speed.

The rotational vibrations S in the driving gear train ARZ are determined by time-synchronous polling of the angle of rotation positions Φ of the printing cylinders DZ1 . . . and forming the difference ΔΦ between, in each case, the adjacent printing cylinders DZ—or, if the vibration measurement is reduced to the first inherent frequency $f_{eig,1}$ (refer to inherent form $S_{eig,1}$. FIG. 2), between the transmitters G, which give the angle of rotation, at the first and last printing cylinder DZ1,DZ of the printing press and with which the maximum vibrational amplitude can be measured. Taking into consideration the diameters of the printing cylinders, the differences ΔΦ in the angle of rotation give the amplitudes of the rotational vibrations S at the circumferences of the printing cylinders (FIG. 3b). The rotational vibrations constantly change the relative position of the gripper systems of the adjacent printing cylinders and transfer drums DZ, ÜT at the instant of sheet transfer. Simultaneously with the measurements of the angle of rotation, the register deviations between the partial printed images, applied in the individual printing units, are determined by an off-line or online evaluation of the printed sheets. The register deviations correlate with the amplitudes of the rotational vibrations S and form the decisive criterion for determining the critical resonance ranges $n_R$ of the rotational speed, in which vibration-reducing measures are required. Transfer register deviations, which lie outside of the permissible tolerance range of $S_{zul} \leq 10$ μm in sheet-fed offset printing, mark the resonance regions of the rotational speeds $n_R$, critical for the printing quality of a sheet-fed printing press.

The rotational vibrations $S_n$ in the resonance regions $n_R$ of the rotational speed critical for the quality of the printing are subjected to an online Fourier analysis and, moreover, divided into i portions with, in each case, a different amplitude $a_i$, frequency n·i and phase position $b_i$. On passing through the individual resonance regions $n_{R,I,i}$ of the rotational speeds, the amplitudes $a_i$ of the discrete harmonic vibration portions, determined by Fourier analysis, change depending on the rotational speed. The harmonic vibration portions with, in each case, the highest amplitudes $a_i$ in a resonance region $n_{R,I,i}$ of the rotational speed, are stored with opposite phase position for each assigned resonance range $n_{R,I,i}$ of the rotational speed as parameters for the compensation moments $M_{K,I,i}$ that are to be applied. In this connection, the frequency n·i, the rotational speed-dependent amplitude $a_{K,i}(n_{R,I,i})$ and the phase position $b_{K,i}$ are the values stored.

The analysis of the vibrations can also be extended to ranges of rotary printing speeds lying outside of the resonance regions $n_R$, so that continuous amplitude-rotational speed functions of the compensation moments $M_K$ are stored for the whole of the range of rotary printing speeds $n_{Ü} \ldots n_O$.

As a rule, because the damping of the vibrations increases as the rotational speed n increases, there will be only a few inherent frequencies $f_{eig,k}$ which lead to relevant resonance vibrations $S_n$ that lower printing quality at rotational speeds ranging from $n_{Ü}$ to $n_O$. These resonance vibrations $S_R$, as a rule, also have only a few discrete harmonic portions, the frequency f of which leads to resonance within the range of rotary printing speeds $n_{Ü} \ldots n_O$, so that only a small number of compensation moments or their parameters have to be stored (FIG. 3b). If the resonance vibrations $S_{R,I,i}$ in a resonance range of rotational speeds $n_{R,I,i}$ are so slight, that they do not exceed the permissible tolerance range $S_{zul}$ for the transfer register, they may be disregarded. This is the case for the resonance range of rotational speeds $n_{R,2,6}$ in the example of FIG. 3b.

Since compensation of the resonance vibrations $S_R$ preferably is to take place over the driving moment $M_A$ of the main drive motor M supplied to the driving gear train ARZ and not at the individual sites of origin of the rotational vibrations S, the transfer of functions, that is, the degrees of damping and the phase shifts of the compensation moments $M_R$ introduced between the main driving mechanism M and the sources of vibration, must be taken into consideration in a further step of the method. The transfer of functions may be obtained from a vibration model of the printing press. For this purpose, however, the position of the vibration sources must be identified precisely and the expense of modeling printing presses is very high. In the interests of simplifying the method, it therefore appears to be appropriate to optimize the compensation parameters empirically in a further sample run. For this purpose, the compensation moments $M_{K,I,i}$ in the assigned resonance ranges of the rotational speed $n_{R,I,i}$ are generated individually by appropriate modulation of the driving motor current $I_M$ of the main drive motor M and superimposed on the continuous driving moment $M_A$. Initially, the phase position $b_{K,I,i}$ is changed until a damping of the vibrations sets in at all sheet transfer sites. After that, the amplitude $a_{K,I,i}$ of the compensation moment $M_{K,I,i}$ is increased until the amplitudes of the register deviations are within the specified tolerance limits $S_{zul}$ at all measurement points at or between the printing units. In this connection, the adherence to tolerance limits rather than the maximum dampening of vibrations is of decisive importance for the required printing quality at each sheet transfer site.

Figure 3C:
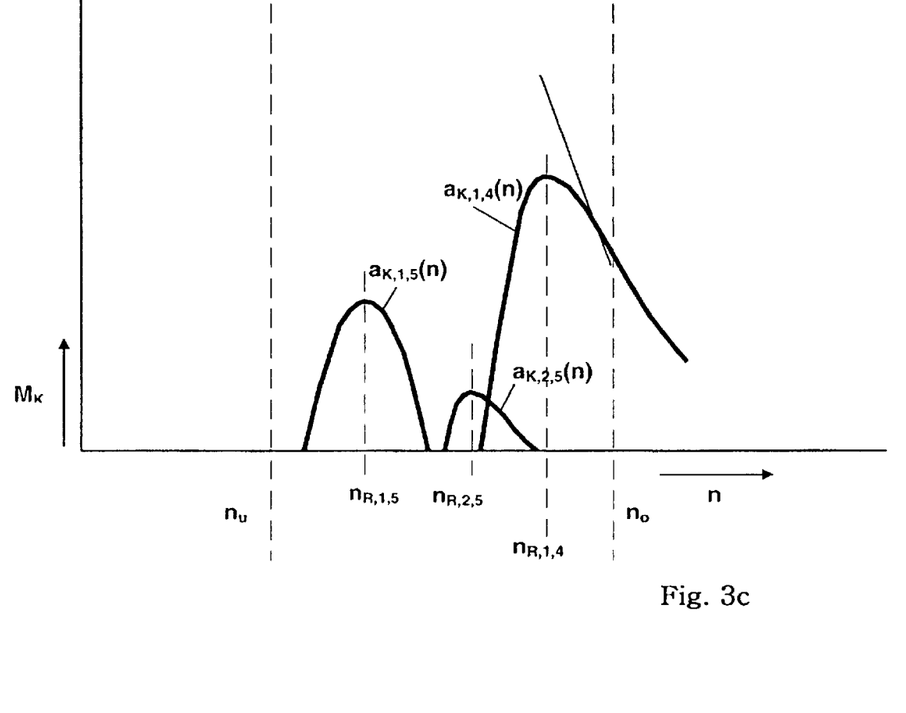
FIG. 3c shows the compensating moments in resonance regions of the rotational speed.
Figure 4A:
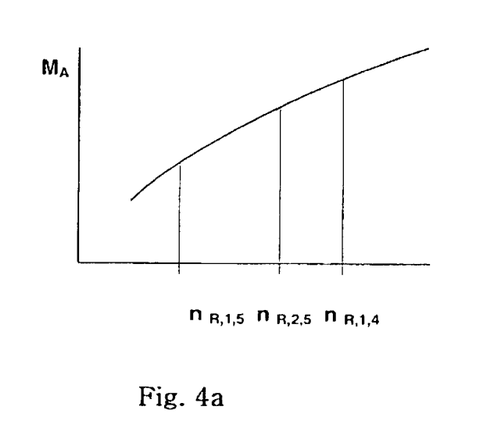
FIG. 4a shows the driving moment of the main drive motor.
Figure 4B:
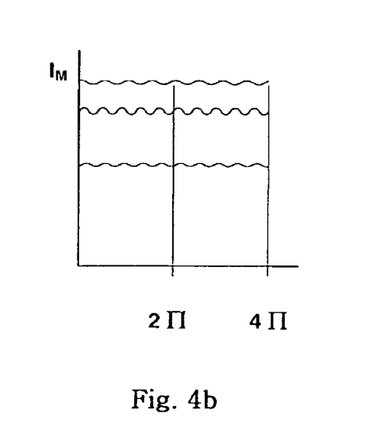
FIG. 4b shows the compensating moment in the driving motor current

The compensation parameters $a_{K,I,i}$, $b_{K,I,i}$ and the assigned rotational speed ranges $n_{R,I,i}$, so optimized, are stored in the drive control system A of the main drive motor M. For this purpose, a separate compensation module KM may be provided, which, when passing through the resonance ranges of the rotational speed $n_{R,I,i}$, transfers the compensation parameters, which are stored for this purpose, over an existing interface to the drive control system A, to the current control, which modulates the current $I_m$ of the driving motor required for the printing operation according to a programmable algorithm, so that the counter-moments $M_K$, required for the compensation, can be impressed on the driving moment $M_A$. On passing through the resonance regions of the rotational speed $n_{r,I,i}$, in each case only the compensation parameters (a, b, i)$_{K,I,i}$, intended for this range of rotational speeds, are activated (FIGS. 3c and 4). In that case, the following counter-moment is acting in the resonance range of the rotational speed $n_{K,I,i}$:

$$M_{K,I,i} = a_{K,I,i}(n_{K,I,i}) \times \sin(t(\text{in}_{K,I,i}) + b_{K,I,i}). \qquad (3)$$

If the printing press vibrates at resonance in one of the inherent frequencies $f_{eig,1}$, time-constant vibration amplitudes $S_{eig,1}$ (inherent forms) are formed over the length of the printing press (FIGS. 1 and 2), the vibrational amplitudes of the relevant first and second inherent forms $S_{eig\ 1}$, $S_{eig\ 2}$ having local extremes at the outer printing units (DW1 and DW4 in the example), so that advantageous prerequisites for an effective compensation of the resonance vibrations $S_R$ over the main drive M are created with an arrangement of the main drive motor M at the first printing unit DW1 after the sheet-feeding apparatus AN, that is, at a place, at which vibrations of high amplitude occur.

Instead of the driving current modulation at the main drive motor M, the inventive method can also be carried out with a torque superimposition by a further driving mechanism, which may be a motor, which acts on the driving gear train ARZ and the driving or breaking moment of which forms the compensation moment $m_K$ in the driving gear train ARZ. For example, a single driving mechanism at a plate cylinder may remain connected in the printing operation with the driving gear train ARZ and supply the compensation moments $M_K$ independently of the main drive motor M to the driving gear train ARZ.

Although the compensation parameters, determined for a typical operating state of the rotary printing press and stored, can develop a sufficient damping also when there are changes in the vibrational behavior of the printing press due to changes in order, the method can be improved by determining and storing the optimum compensation parameters for characteristic, frequently repeating, deviating operating states. Different operating conditions of the rotary printing press can be created, for example, by different operating modes of driving mechanisms or transmissions with different damping properties, the switching on or off of individual peripheral function groups or by different friction of the cylinders or rollers carrying the ink. If optimum compensation parameters for each of the characteristic operating states are determined in the test runs and stored in the compensation module KM and activated in the drive control system A in a later actual printing operation depending on the operating states, a constantly optimum vibration compensation can be achieved at least for printing orders with standard machine settings.

The inventive methods can be expanded advantageously by an automated adaptation of the compensation moment $M_K$ to the changes in the vibrational behavior of the printing press during the printing operation, which depend on the mode of operation if at least two transmitters G, which measure the angle of rotation, are present permanently at the printing press (for example, transmitters G, which measures the angle of rotation, at the start and end of the driving gear train ARZ, as is known, for example, for sheet-fed rotary printing presses with a sheet-turning device).

By constantly detecting the amplitudes $a_i$ and the phase positions $b_i$ of the rotational vibrations S with the help of programmed filter algorithms, the actual vibration parameters of the resonance vibrations ($S_R$) can be determined continuously during the printing operation in automated cycles, corrections can be made to the stored compensation parameters and the driving moments ($M_A$) can be superimposed with the corrected compensation moments $M_K$.

With that, the parameters of the compensation moment $M_K$ can be adapted cyclically to the operating state of the rotary printing press and resonance vibrations can be compensated for optimally all times. Advisably, the actualization cycles for the compensation parameters are initiated by the machine control system by activating settings relevant for the respective operating state.

The inventive method can also be used on dynamically separated, subset machines with separate driving motors $M_j$, such as, for example, on printing unit groups j before and after a sheet-turning device, when this denotes a separation line in the driving gear train ARZ and, as a result, the driving gear train is divided into two dynamically independent driving gear trains $ARZ_j$ each with a driving motor $M_j$. In these cases, the resonance vibrations $S_{Rj}$ in each subset machine j or group of printing or coating units j are determined separately and compensated for separately with the assigned driving control systems $A_j$ and the assigned main drive motors $M_j$.

Figure 5:
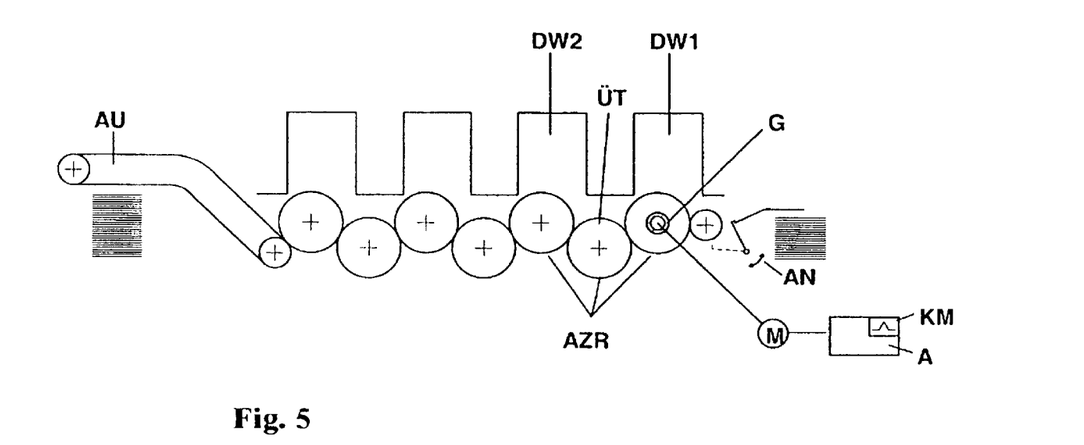
FIG. 5 is a diagrammatic representation of a sheet-fed rotary printing press with a sheet-feeding apparatus and FIG. 6 shows the principle of compensating for the vibrations at the sheet-feeding apparatus.

A sheet-fed rotary printing press of series construction with a sheet-feeding apparatus AN, printing units DW1, DW2 and sheet-delivery equipment AU is shown diagrammatically, by way of example, in FIG. 5. Of the printing units DW, only the vibration-relevant sheet-carrying printing cylinders DZ and the transfer drums ÜT are shown. At least the rotational movements of these rotating bodies are synchronized over a continuous driving gear train ARZ. The driving moment $M_A$ for the printing press is provided by a main drive motor M at the printing cylinder DZ1 of the first printing unit DW1 to the driving gear train ARZ and flows from there over the driving gear train ARZ into the second and all subsequent printing and/or coating units. At the same time, a portion of the driving moment $M_A$ flows in the opposite direction to the sheet-feeding apparatus AN.

The rotational speed and torque of the main drive motor M is controlled by a drive control system A. The drive control system A for the main drive motor M is a known, programmable drive controller, which is tied into the machine control system. The drive controller has a programmable module KM for storing the compensation moments $M_{AK}$.

Figure 6:
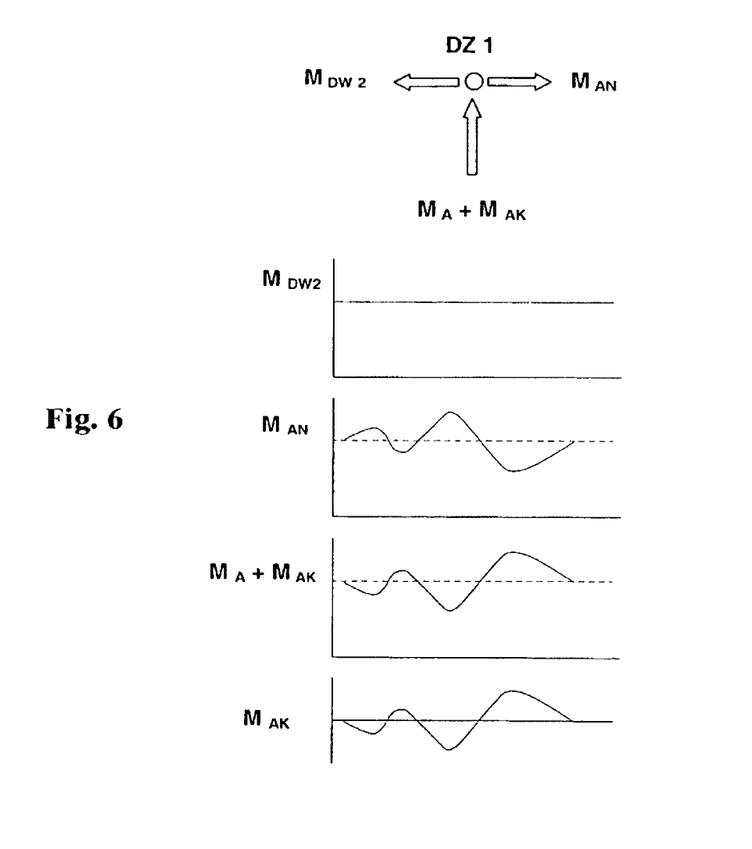

A plurality of cyclical operating movements for the transport and precise alignment of sheets take place in a sheet-feeding apparatus. The movements take place with periodic acceleration and deceleration of the working organs and, because of this, are associated with load changes in the driving system of the sheet-feeding apparatus AN. Since the sheet-feeding apparatus AN is coupled at the drive side with the driving gear train ARZ at the adjacent first printing unit DW1, these periodic (synchronous) torque fluctuations or torque vibrations $M_{AN}$ are transferred initially to the driving gear train ARZ in a first printing unit and then, over the tooth flank contacts of the engaged gearwheels, to the subsequent printing and/or coating units. As a result of the elasticity of the driving gear wheels and the inertia of the driven rotating bodies DZ,ÜT, rotational vibrations would result over the whole length of the driving gear train ARZ. These torque vibrations $M_{AN}$ of the sheet-feeding apparatus AN, which are critical for the quality of the printing, are now compensated for pursuant to the invention at the place, at which they are transferred to the driving gear train ARZ, that is, the first printing unit DW1, with the main drive motor M, which is also driving in at this place, in that the driving moments $M_A$ of this driving motor M are impressed on the compensation moment $M_{AK}$ that is directed counter to the interfering torque vibrations $M_{AN}$. The torque vibrations $M_{AN}$ from the sheet-feeding apparatus AN are canceled at the driving-in side of the main drive motor M. The resulting driving torque $M_{AN}+M_A+M_{AK}$, flowing to the second printing unit, therefore is free of vibrations (FIG. 6).

The inventive method makes use of the advantage that the torque vibrations, generated within the sheet-feeding apparatus, can be determined quite accurately by known methods of calculation. It is a question of closed systems with known masses and movements, which can be modeled precisely and take place largely independently of the effect of the properties of the sheets, which are to be processed.

The torque fluctuations $M_{AN}$ are handled as torque vibrations and subjected to a Fourier analysis, which provides Fourier coefficients of a continuous $M_{AN}(\Phi)$ function, After that, the vibrations can be described as the sum of i discrete vibrations with different proportions $a_i$, frequencies in and phase positions $b_i$:

$$M_{AN}=a_0+a_i\sin(t(1n)+b_1)+a_2\sin(t(2n)+b_2)+\ldots a_i\sin(t(in)+b_i) \quad (4)$$

with $\Phi=$tin

In this case, the compensation moments $M_{AK}$ of the main drive motor are stored as Fourier function with opposite phase positions in the module KM of the driving control system A.

As a result of the Fourier coefficient determination or a torque measurement, the periodic torque fluctuations $M_{AN}$ can also be filed as discrete ($\Phi$, $M_{AKj}$) value pairs with opposite phase position in the storage module for the compensation moment KM.

Since the compensation moments $M_{AK}$, as well as the driving moments $M_A$, depend on the specified rotational speed n and therefore must be stored separately for each possible rotational speed, it is advisable to store them as (normalized) quantities $M_{AK}/M_A$ related to the driving moment $M_A$ of the main drive motor M.

If it is not intended to calculate the compensation moments, the alternative possibility exists of measuring the torque fluctuations $M_{AN}$ by means of suitable torque sensors at the drive shaft of the sheet-feeding apparatus AN or of determining the angle of the rotation dependence of the driving motor current $I_M$ of the main drive motor M with the printing and coating units DW uncoupled.

In order to compensate for the torque vibrations $M_{AN}$ of the sheet-feeding apparatus AN, the normalized compensation moment $M_{AK}/M_A(\Phi)$ assigned to the set rotational speed (printing speed) or all assigned ($\Phi$, $M_{AK}$, $M_A$) value pairs in the module KM are invoked as a function of the rotational speed and the driving motor current $I_M$ of the main drive motor M is modulated accordingly with the help of the M-I transfer functions implemented in the drive control system A.

Instead of the driving current modulation at the main drive motor M, the inventive method can be carried out equally well with a torque superimposition by a second driving mechanism, which may be a significantly smaller motor, which acts almost without delay on the driving gear train ARZ at the first printing unit DW1 and the driving or breaking moment of which impresses the compensation moments $M_{AK}$ into the driving gear train ARZ. Due to the inventive method, a printing press driving mechanism, which drives the driving gear train without vibrations and is not affected by the configuration as a whole, can be created with simple means. A performance equalization at the driving-in site of the main drive motor at the first printing unit after the sheet-feeding apparatus is achieved without additional mechanical transmissions. By these means, higher printing speeds become possible without disorders from the sheet-feeding apparatus becoming noticeable. The vibration-related wear is reduced and the printing result improved.

LIST OF REFERENCE SYMBOLS USED

A, $A_i$ drive control system
AN sheet-feeding apparatus
ARZ, $ARZ_i$ driving gear train
AU sheet-delivery equipment
DW, DW1 . . . printing or coating units
DZ, $DZ_1$ . . . printing cylinders
G transmitter, which measures the angle of rotation
M, $M_j$ main drive motor
$I_M$ driving motor current
KM module for compensation parameter
$M_A$ driving moment
$M_K$ compensation moment
$M_{AN}$ torque vibration of the sheet-feeding apparatus
S rotational vibration, excitation vibration
$S_{eig}$ inherent form
$S_R$ resonance vibration
$S_{zul}$ permissible tolerance range for rotational vibrations
ÜT, ÜT1 . . . transfer drums
a amplitude of the rotational vibration
$a_i$ amplitude of the $i^{th}$ harmonic vibration
$a_K$ amplitude of the compensation vibration
b phase position of the rotational vibration
$b_i$ phase position of the $i^{th}$ harmonic vibration
$b_K$ phase position of the compensation vibration
f frequency of the rotational vibration, excitation frequency
$f_{eig}$ inherent frequency
I order of the discrete harmonic vibration portion (excitation order)
J dynamic, independent printing or coating unit group
I order of the inherent frequency
n rotational speed
$n_o$ upper rotational spade
$n_R$ resonance rotational speed
$n_u$ lower rotational speed
t time
$\Delta\Phi$ angle of rotation difference between the printing cylinders
$\Phi$ angle of rotation

What is claimed is:

1. A method of compensating for register deviations, caused by rotational vibrations, in a sheet-fed rotary printing press with a driving gear train (ARZ), connecting a sheet-feeding apparatus (AN) and printing units and/or coating units (DW), and a main drive motor (M), acting on the driving gear train, to which a drive control system (A) is assigned, with the following steps:
   performing a one-time determination of rotational vibrations (S) in the driving gear train (ARZ) and of assigned register deviations at the printing and coating units only in the resonance regions of the rotational speed ($n_R$) while passing through a printing speed range $n_U$ to $n_O$ under printing conditions during a calibration operation,
   ascertaining discrete harmonic portions of the rotational vibrations (S) determined for the resonance ranges of the rotational speed ($n_R$), in which register deviations outside of a permissible tolerance range occur,
   ascertaining parameters for oppositely directed harmonic compensation moments ($M_K$) from the harmonic portions of the rotational vibrations (S) detected,
   storing the parameters of the compensation moments ($M_K$) and their assignments to the resonance ranges of rotational speed ($n_R$) and
   superimposing the stored compensation moments ($M_K$) as a function of the rotational speed on the driving moment ($M_A$) of the main drive motor (M) only in the resonance regions of the rotational speed ($n_R$) during printing operation.

2. The method of claim 1, wherein the parameters for the compensation moments ($M_K$) in the driving gear train (ARZ) are determined and stored for different operating states of the rotary printing press and, depending on the operating state, superimposed on the driving moment ($M_A$).

3. The method of claim 1, wherein the compensation moments ($M_K$) determined are superimposed depending on the rotational speed on the driving moment ($M_A$) of the main drive motor (M) and, at the same time, the parameters of the compensation moment ($M_K$) are optimized.

4. The method of claim 1, wherein the compensation moments ($M_K$) are generated by modulation of the motor current ($I_M$) of the main drive motor (M).

5. The method of claim 1, wherein the compensation moments ($M_K$) of a further driving motor are introduced into the driving gear train (ARZ).

6. The method of claim 1, wherein the rotary printing press is formed from several printing or coating unit groups (j) with, in each case, their own driving gear train ($ARZ_1$) and their own driving motor ($M_j$) and the compensation moments ($M_{K,j}$) are determined separately and optimized for each printing or coating unit group (j).

7. The method of claim 1, wherein the main drive motor (M) is assigned to the first or last printing or coating unit (DW) of a rotary printing press or of a group of printing of coating units (j).

8. The method of claim 1, wherein the rotational vibrations (S) are determined with transmitters (G), which measure the angle of rotation at printing cylinders (DZ).

9. The method of claim 8, wherein transmitters (G), which measure the angle of rotation, are disposed at the first and last printing or coating unit (DW) of a printing press or of a group of printing or coating units (j).

10. The method of claim 1, wherein, during the printing operation in automatic cycles, the actual vibration parameters of the resonance vibrations ($S_R$) are determined with the help of programmable filter algorithms, whereupon parameter corrections for the stored compensation moments ($M_K$) are made and the actual, corrected compensation moments ($M_K$) are superimposed on the driving moments ($M_A$).

11. The method of claim 1, wherein, for reducing rotational vibrations, which are caused by the sheet-feeding apparatus (AN), the method further includes the following steps:

performing a one-time determination of torque vibrations ($M_{AN}$), which are transferred from the sheet-feeding apparatus (AN) to the driving gear train (ARZ) as a function of the rotational speed (n) during a calibration operation, storage of counter-directed compensation torques ($M_{AK}$) in the driving control system (A) and the rotational speed-dependent superimposition of the compensation torque ($M_{AK}$) on the driving moment ($M_A$) of the main drive motor (M) during printing operation, so that the resulting driving torque $M_{DW2}$ to the second printing or coating unit is free of the rotational vibrations ($M_{AN}$) of the sheet-feeding apparatus.

12. The method of claim 11, wherein the torque vibrations ($M_{AN}$) are calculated from a torque model of the sheet-feeding apparatus (AN).

13. The method of claim 11, wherein the torque vibrations ($M_{AN}$) are ascertained from measurements of the torque or motor current or angle of rotation.

14. The method of claim 11, wherein the compensation moments ($M_{AK}$) are generated by modulation of the driving motor current ($I_M$) of the main drive motor (M).

15. The method of claim 11, wherein the compensation moments ($M_{AK}$) are formed by a second high dynamic driving mechanism, which interacts with the main drive motor (M).

* * * * *